(12) United States Patent
Zhou et al.

(10) Patent No.: US 7,965,618 B2
(45) Date of Patent: Jun. 21, 2011

(54) COMMUNICATION SYSTEMS

(75) Inventors: Yuefeng Zhou, Haywards Heath (GB); Michael John Beems Hart, London (GB)

(73) Assignee: Fujitsu Limited, Kawasaki (JP)

( * ) Notice: Subject to any disclaimer, the term of this patent is extended or adjusted under 35 U.S.C. 154(b) by 933 days.

(21) Appl. No.: 11/840,492

(22) Filed: Aug. 17, 2007

(65) Prior Publication Data
US 2008/0043709 A1 Feb. 21, 2008

(30) Foreign Application Priority Data
Aug. 18, 2006 (GB) .................................. 0616471.9

(51) Int. Cl.
H04L 5/06 (2006.01)
H04B 7/208 (2006.01)
H04B 7/212 (2006.01)
H04W 72/00 (2009.01)

(52) U.S. Cl. ........ 370/203; 370/319; 370/344; 370/348; 455/450

(58) Field of Classification Search .......... 370/203–211, 370/312–348; 375/130–150; 455/449–456.6
See application file for complete search history.

(56) References Cited

U.S. PATENT DOCUMENTS

| | | | |
|---|---|---|---|
| 5,719,868 A | 2/1998 | Young | |
| 6,370,384 B1 | 4/2002 | Komara | |
| 6,701,129 B1 | 3/2004 | Hashem et al. | |
| 7,096,274 B1 | 8/2006 | Ci et al. | |
| 7,599,341 B2 * | 10/2009 | Ramachandran | 370/338 |
| 7,843,834 B2 * | 11/2010 | Picard | 370/238 |
| 2002/0080816 A1 | 6/2002 | Spinar et al. | |
| 2003/0054771 A1 | 3/2003 | Chappaz | |
| 2004/0005861 A1 | 1/2004 | Tauchi | |
| 2004/0100929 A1 | 5/2004 | Garcia-Luna-Aceves | |
| 2004/0109428 A1 | 6/2004 | Krishnamurthy | |
| 2005/0014464 A1 * | 1/2005 | Larsson | 455/11.1 |
| 2005/0030887 A1 | 2/2005 | Jacobsen et al. | |
| 2005/0048914 A1 | 3/2005 | Sartori et al. | |
| 2006/0023745 A1 | 2/2006 | Koo et al. | |

(Continued)

FOREIGN PATENT DOCUMENTS

EP 0 151 280 12/1984

(Continued)

OTHER PUBLICATIONS

IEEE Std 802.16a-2003 (Amendment to IEEE Std 802.16-2001), IEEE Standard for Local and Metropolitan Area Networks Part 16: Air Interface for Fixed Broadband Wireless Access Systems—Amendment 2: Medium Access Control Modifications and Additional Physical Layer Specifications for 2-11 GHz, Apr. 2003, IEEE, pp. i, 115-116, 119, 156-158 and 182-183.*

(Continued)

Primary Examiner — Tri H Phan
(74) Attorney, Agent, or Firm — Baker Botts L.L.P.

(57) ABSTRACT

In accordance with one embodiment of the present invention, a wireless transmission method for use in a multi-hop wireless communication system includes determining for a particular transmission at least one measure of the expected link characteristics for at least two links of a communication path, and for each of those links, configuring a particular transmission window by setting its shape and/or a transmission format to be used in that window in dependence upon the measure for that link only. Furthermore, the method includes, during that particular transmission, transmitting information along those links using, for each of those links, the particular transmission window for that link.

24 Claims, 10 Drawing Sheets

Flow chart of distributed BPRS

U.S. PATENT DOCUMENTS

| | | | |
|---|---|---|---|
| 2006/0256741 A1 | 11/2006 | Nozaki | |
| 2006/0264172 A1 | 11/2006 | Izumikawa et al. | |
| 2007/0060050 A1* | 3/2007 | Lee et al. | 455/13.1 |
| 2007/0081483 A1* | 4/2007 | Jang et al. | 370/315 |
| 2007/0087691 A1* | 4/2007 | Lee et al. | 455/13.2 |
| 2007/0191015 A1* | 8/2007 | Hwang et al. | 455/442 |
| 2007/0217539 A1* | 9/2007 | Ihm et al. | 375/267 |
| 2008/0188231 A1* | 8/2008 | Zhu et al. | 455/450 |
| 2009/0129334 A1* | 5/2009 | Ma et al. | 370/331 |

FOREIGN PATENT DOCUMENTS

| | | |
|---|---|---|
| EP | 1 617 693 | 1/2006 |
| EP | 1 635 592 | 3/2006 |
| EP | 1 677 443 | 7/2006 |
| EP | 1 804 430 A1 | 7/2007 |
| WO | WO 99/44341 | 9/1999 |
| WO | WO 01/76289 | 10/2001 |
| WO | WO 03/058984 | 7/2003 |
| WO | WO 2004/056013 | 7/2004 |
| WO | WO 2004/107693 | 12/2004 |
| WO | WO 2005/067173 | 7/2005 |
| WO | WO 2006/012554 | 2/2006 |
| WO | WO 2006/065069 | 6/2006 |
| WO | WO 2006/098608 | 9/2006 |
| WO | WO 2006/120161 | 11/2006 |

OTHER PUBLICATIONS

IEEE Std 802.16-2004 (Revision of IEEE Std 802.16-2001), IEEE Standard for Local and Metropolitan Area Networks Part 16: Air Interface for Fixed Broadband Wireless Access Systems, Oct. 2004, IEEE, pp. i, ii, iv, 164, 307, 496-501, 605 and 610.*

IEEE P802.16e/D12, Draft IEEE Standard for Local and Metropolitan Area Networks Part 16: Air Interface for Fixed Broadband Wireless Access Systems—Amendment for Physical and Medium Access Control Layers for Combined Fixed and Mobile Operation in Licensed Bands, Oct. 2005, IEEE, pp. i and 279-280.*

Communication from the European Patent Office, European Search Report for Application No. EP 07 11 3538, Dec. 27, 2007, 7 pages.

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group <http://ieee802.org/16>, pp. 0-3, Nov. 6, 2006.

Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.

Hart et al., >, "TDD MR Frame Structure," IEEE 802.16 Broadband Wireless Access Working Group < http://ieee802.org/16>, pp. 1-10, Oct. 20, 2006.

Hart, "Dimensioning and System Level Analysis of an HSDPA Network with Relaying Nodes," 5 pages, 2005.

Chu, "Polyphase Codes with Good Periodic Correlation Properties," IEEE Transactions on Information Theory, Jul. 1972, pp. 531-532.

Frank et al., "Phase Shift Pulse Codes with Good Periodic Correlation Properties," IRE Transactions on Information Theory, pp. 381-382, Oct. 1962.

Milewski, "Periodic Sequences with Optimal Properties for Channel Estimation and Fast Start-Up Equalization," IBM Research and Development Journal, pp. 426-431, Sep. 1983.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82-87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

Hart et al., "Communication Systems," Pending U.S. Appl. No. 11/856,178, filed Sep. 17, 2007.

Communication from the European Patent Office, European Search Report for Application No. EP 08 15 8421, Oct. 21, 2008, 1 pages.

Communication from the European Patent Office, European Search Report for Application No. EP 07 11 3481, Oct. 19, 2007, 1 pages, Oct. 21, 2008.

Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.

Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

Etri et al, Transmission of IP Packets over Ethernet over IEEE 802.16, draft-riegel-l6ng-ip-over-eth-over-80216-01.txt, Oct. 1, 2006, pp. 1-16.

Kim et al., Fair and Efficient Multihop Scheduling Algorithm for IEEE 802.16 BWA Systems, pp. 895-901, Oct. 3-7, 2005.

European Patent Office, European Search Report for Application No. EP 08 15 5435, Aug. 1, 2008, 8 pages.

European Patent Office, European Search Report for Application No. EP 07 11 3483, Sep. 26, 2007, 6 pages.

IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.

Hart et al., "Factors That Affect Performance of a Mobile Multihop Relay System," IEEE 802.16 Presentation Submission Template (Rev.8.3), Sep. 13, 2005, 19 pages.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

* cited by examiner

Fig. 1
Wireless relay scenarios in WiMAX

Fig. 2 — Prior Art —

Illustration of OFDMA frame with multiple permutation zones

*Fig.3*  -- Prior Art --

Example of burst allocation

*Fig.5*

Different burst dimensions result in different burst error rate

Fig. 4 — Prior Art —

Illustration of allocating bursts into PUSC one in an OFDA TDD frame

Fig. 6
Flow chart of centralized BPRS

Fig.7

Flow chart of distributed BPRS

Example TDD frame structure from OFDMA physical layer of the IEEE802.16 standard

COMMUNICATION SYSTEMS

RELATED APPLICATION

This application claims foreign priority benefits under 35 U.S.C. §119 of United Kingdom Application No. GB 0616471.9, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,518, filed Aug. 17, 2007 and currently pending;
COMMUNICATION SYSTEMS, application Ser. No. 11/840,546, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,595, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

TECHNICAL FIELD

This invention relates in general to communication systems, and more particularly to burst profile re-dimensioning schemes.

Overview

Currently there exists significant interest in the use of multihop techniques in packet based radio and other communication systems, where it is purported that such techniques will enable both extension in coverage range and increase in system capacity (throughput).

Figure 8:
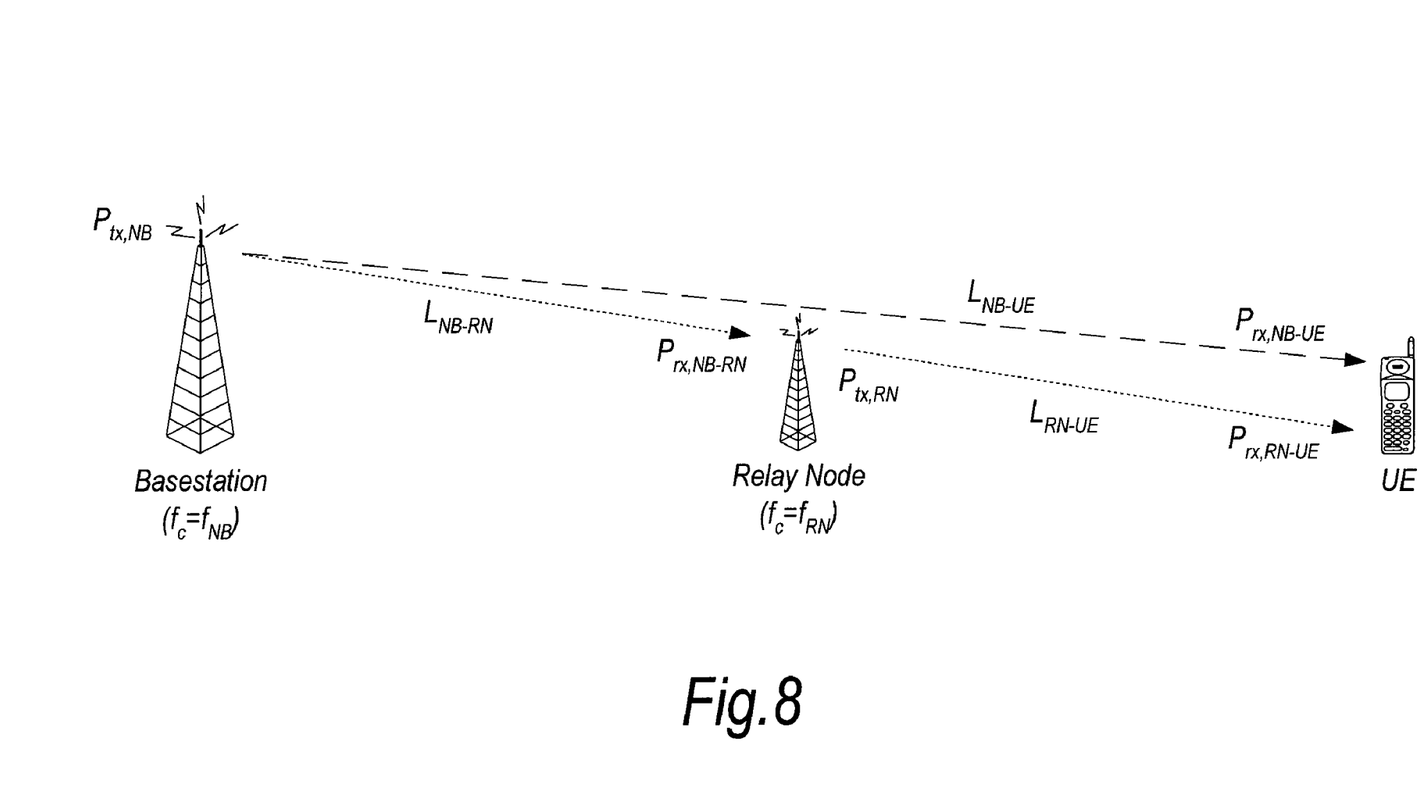
FIG. 8 shows a single-cell two-hop wireless communication system.

In a multi-hop communication system, communication signals are sent in a communication direction along a communication path (C) from a source apparatus to a destination apparatus via one or more intermediate apparatuses. FIG. 8 illustrates a single-cell two-hop wireless communication system comprising a base station BS (known in the context of 3 G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

Figure 9A:
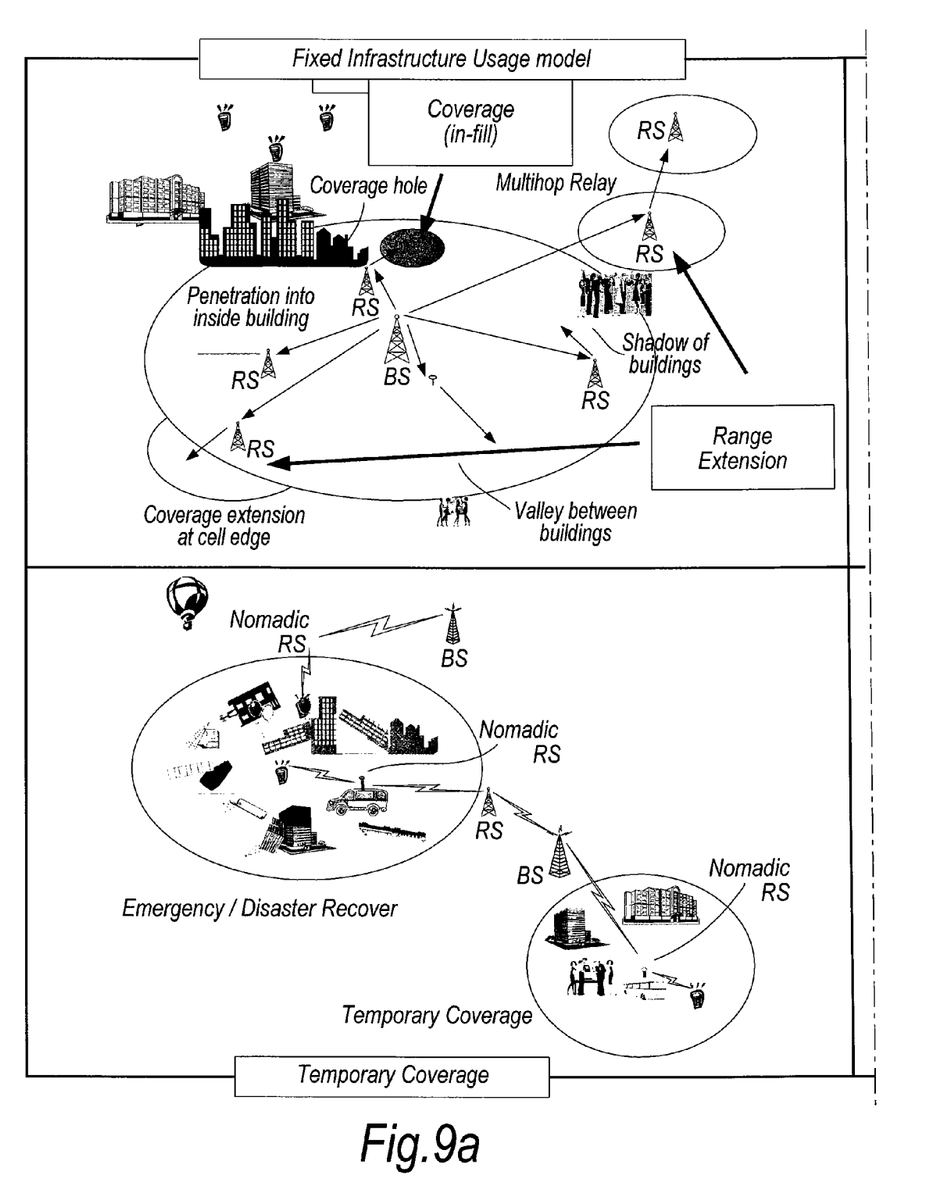
FIGS. 9A & 9B show applications of relay stations.
Figure 9B:
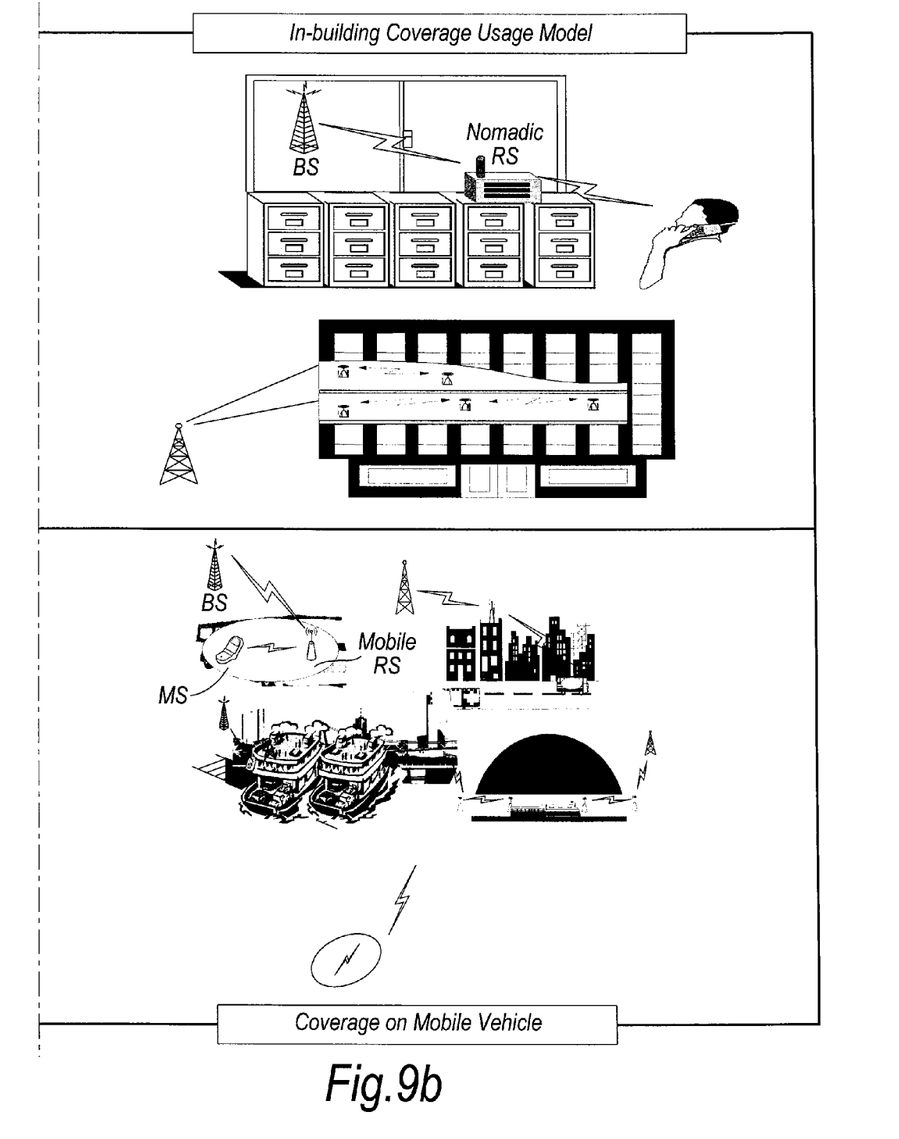

FIGS. 9A & 9B illustrate a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 9A is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 9B provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n \log d \qquad (A)$$

Where d (meters) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \qquad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \quad 0 \leq t \leq T_s \quad (1)$$

where $\Delta f$ is the sub-carrier separation in Hz, $T_s=1/\Delta f$ is symbol time interval in seconds, and $c_n$ are the modulated source signals. The sub-carrier vector in (1) onto which each of the source signals is modulated $c \in C_n$, $c=(c_0, c_1 \ldots C_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode.

Figure 10:
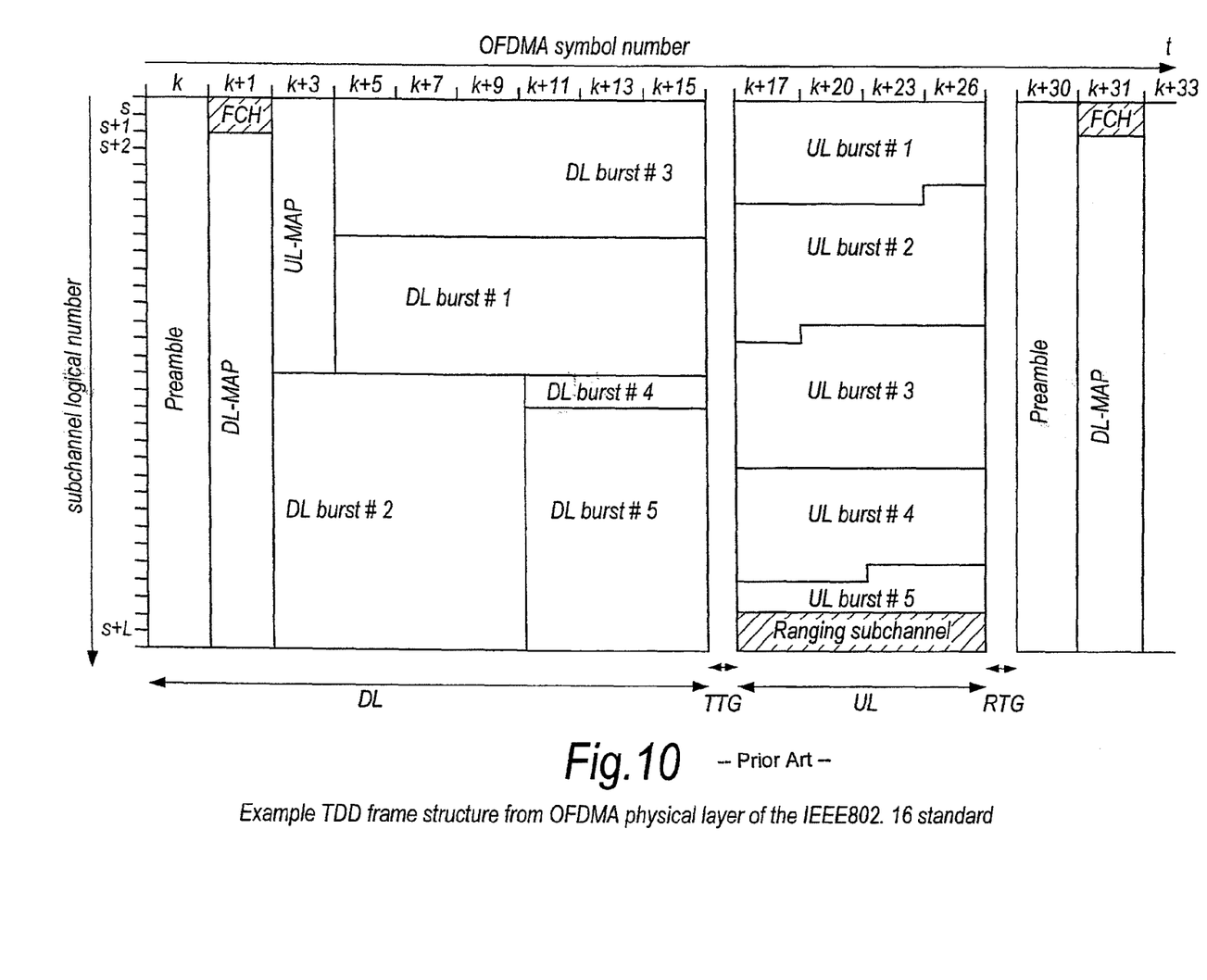
FIG. 10 shows a single hop TDD frame structure used in the OFDMA physical layer mode of the IEEE 802.16 standard.

As an example, FIG. 10 illustrates the single hop TDD frame structure used in the OFDMA physical layer mode of the IEEE 802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a wireless transmission method for use in a multi-hop wireless communication system is provided. The system includes at least three communication apparatuses, one said communication apparatus comprising a source apparatus, another said communication apparatus comprising a destination apparatus and the other said communication apparatus comprising an intermediate apparatus. Said source apparatus is operable to transmit information in a transmission window in a communication direction along a communication path extending from the source apparatus to the destination apparatus via the intermediate apparatus. The transmission window has a shape defined by a transmission frequency bandwidth profile over a transmission interval, and the communication path includes a series of two or more consecutive links from the source apparatus to the destination apparatus. The intermediate apparatus is operable to receive information from a previous communication apparatus in said communication direction and to transmit the received information in such a transmission window to a subsequent apparatus in said communication direction. The wireless transmission method for use in such a multi-hop wireless communication system includes determining for a particular transmission at least one measure of the expected link characteristics for at least two links of the communication path, and for each of those links, configuring a particular transmission window by setting its shape and/or a transmission format to be used in that window in dependence upon the measure for that link only. Furthermore, the method includes, during that particular transmission, transmitting information along those links using, for each of those links, the particular transmission window for that link.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
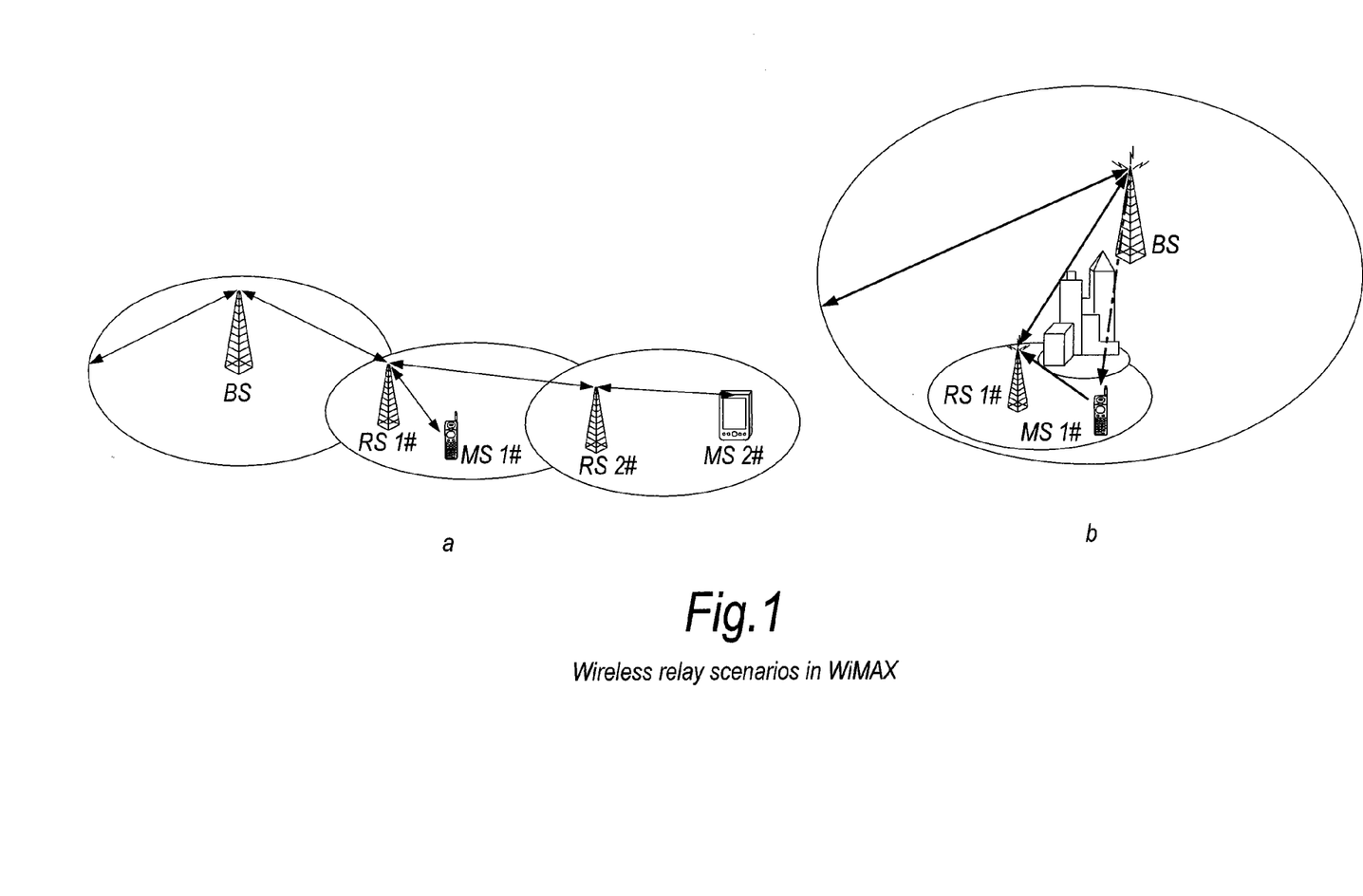
FIG. 1 shows wireless relay scenarios in WiMAX.

By using relay in wireless communication systems, both the quality of service (QoS) and the coverage can be improved. FIG. 1 shows two typical application scenarios of WiMAX relay. In FIG. 1.a, by using the relay stations (RS), more areas can be covered. In FIG. 1.b, the RS can improve the QoS for mobile stations (MS), which is suffering from the shadow of buildings. In this proposal, the RS 1# and RS 2# are called the first-hop RS, and the second-hop RS respectively; the MS1 # and MS 2# are called the second-hop MS and the third-hop MS respectively.

Figure 2:
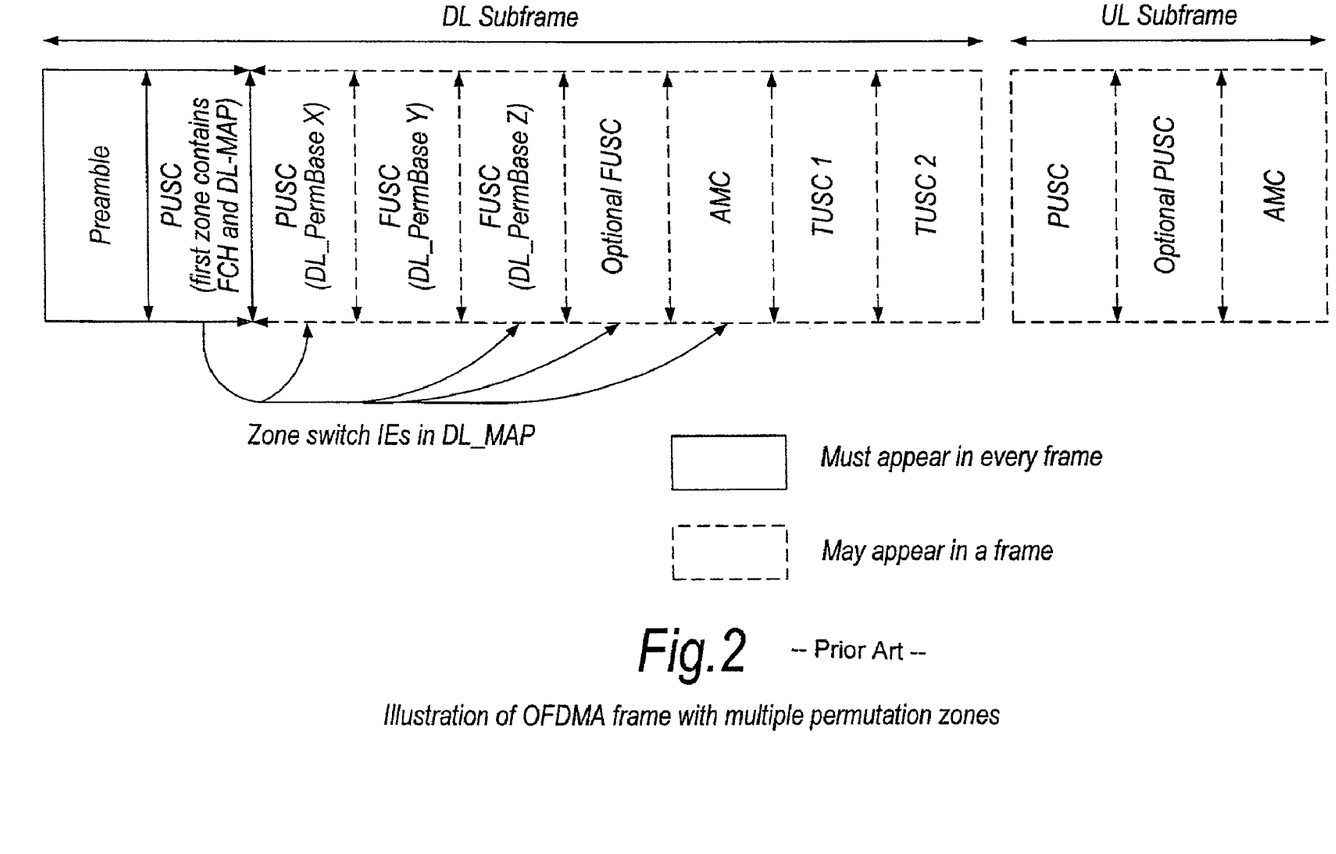
FIG. 2 shows an example of permutation zones in one OFDMA frame.

The OFDMA-based (Orthogonal Frequency Division Multiplexing Access) WiMAX divides a signal into sub-channels (i.e. groups of carriers), with each subchannel being allocated to different OFDM (Orthogonal Frequency Division Multiplexing) subscribers. Each MS can be treated separately independent of location, and distance from the base station, interference and power controls. The whole frame will be divided by different permutation zones. Each permutation zone type is appropriate to different radio channel environment and different network/cell deployment. For instance, FIG. 2 shows an example of permutation zones in one TDD frame.

Figure 3:
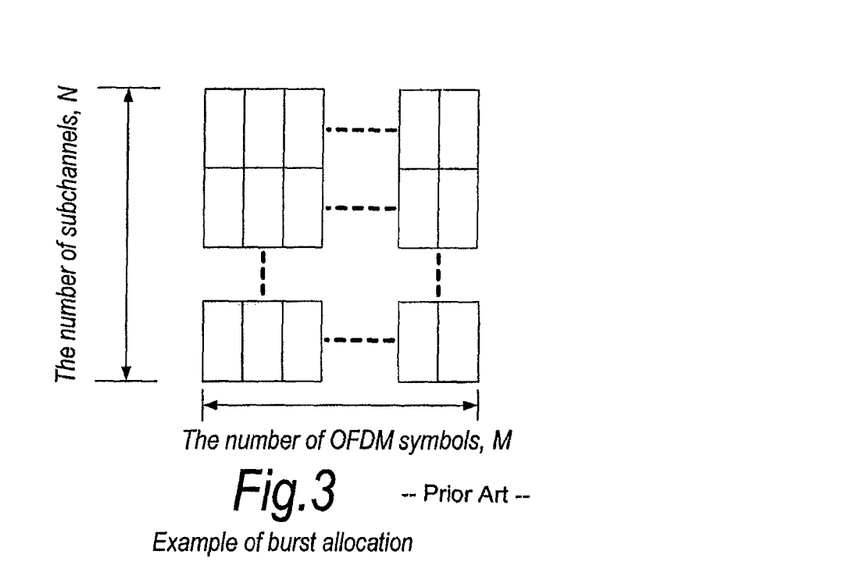
FIG. 3 shows an example of burst allocation.

Normally, a service connection/flow of a MS will be arranged to using a proper permutation zone by the radio resource management algorithms in terms of QoS demands, radio channel conditions, and other factors. Within a permutation zone, a two-dimensional area of a group of subchannels will be allocated to a service connection of a MS. This two-dimensional allocation is called "burst". The minimum allocation unit for a burst is slot in WiMAX. A burst may be visualized as a rectangle, which can be represented by $N_{Subchannels} \times M_{OFDM\_Symbols}$ (FIG. 3).

Figure 4:
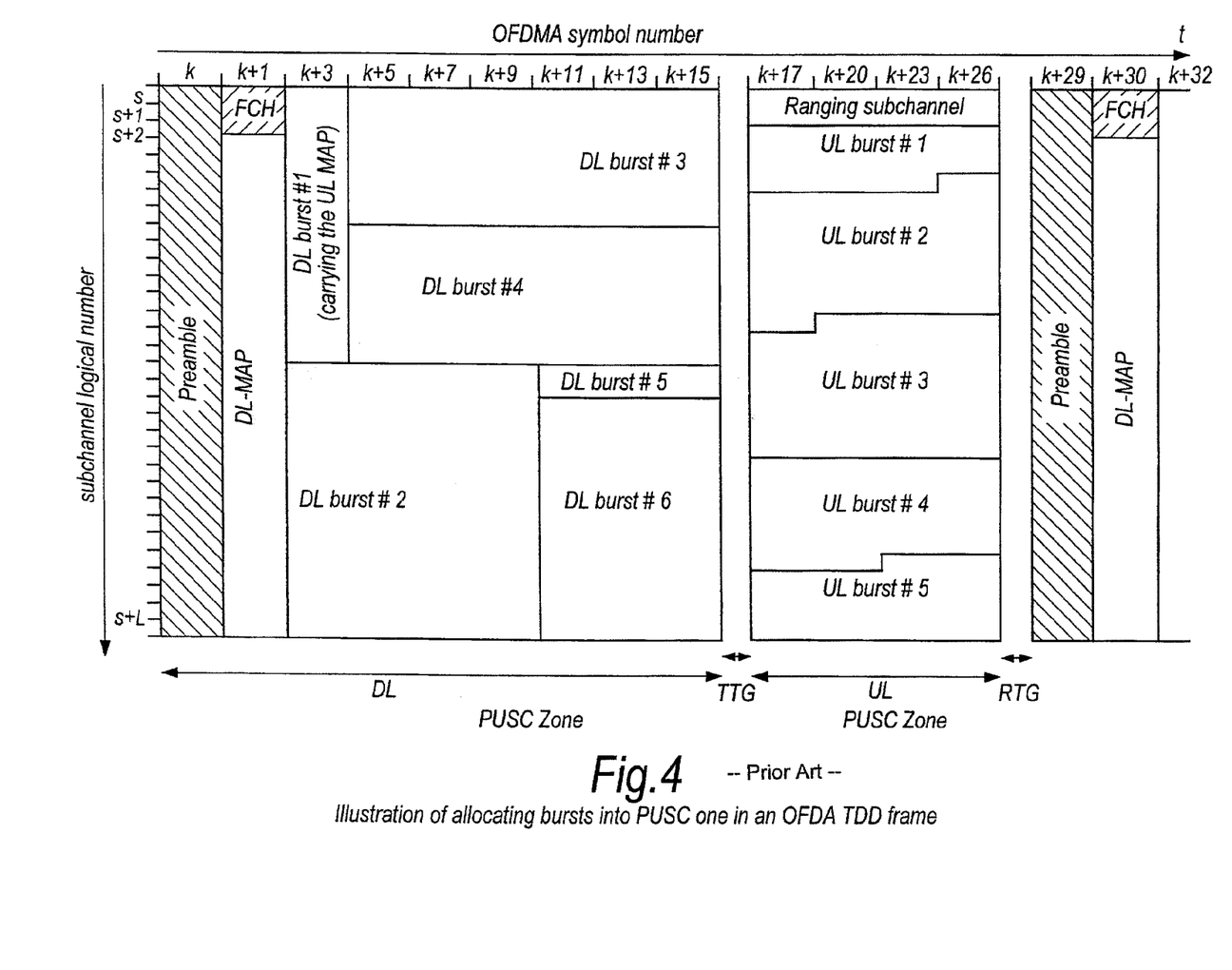
FIG. 4 shows an example of allocating bursts into PUSC (Partial Utilized Subchannelization) permutation zone in an OFDMA TDD frame.

FIG. 4 shows an example of allocating bursts into PUSC (Partial Utilized Subchannelization) permutation zone in an OFDMA TDD frame. To a specific payload of a burst, there are many possible combinations of the value N and M. How to decide the values of N and M is a main part of a burst dimensioning algorithm, which will strongly impact the bit error rate (BER) performance and QoS in WiMAX.

Figure 5:
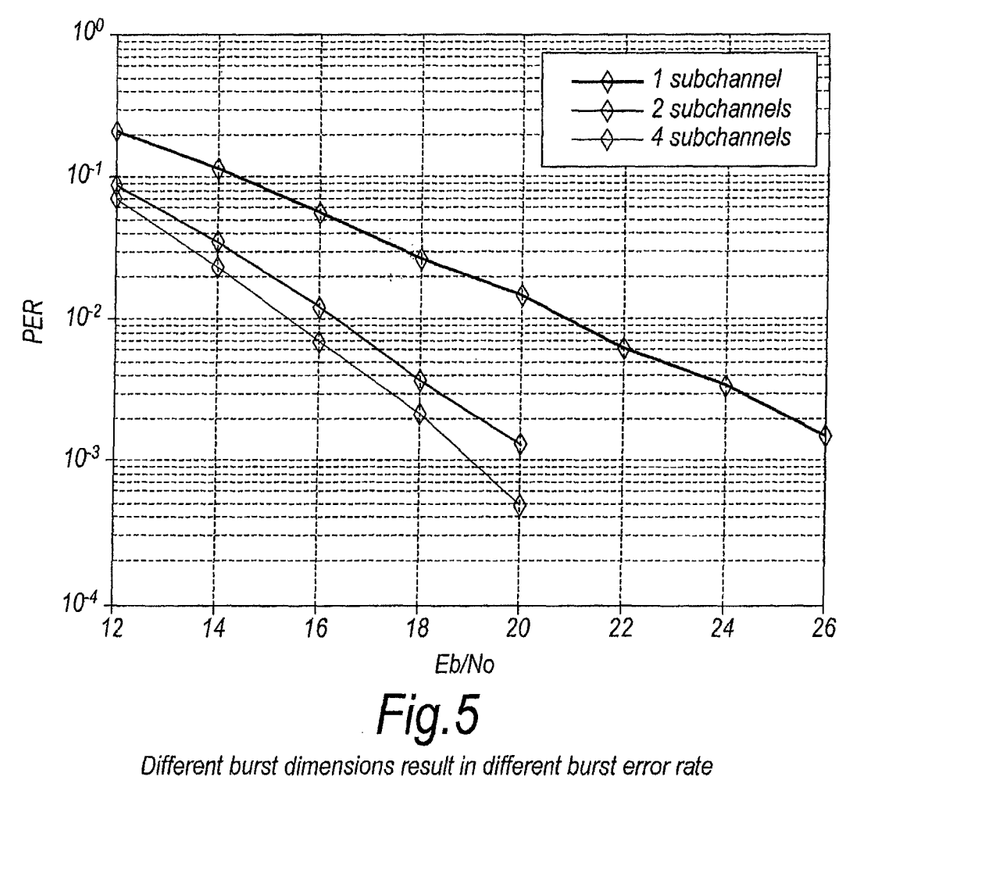
FIG. 5 shows the burst error rate for different dimension of a burst with fixed payload.

FIG. 5 shows the burst error rate for different dimension of a burst with fixed payload, which is 4 slots. The channel model is ITU Pedestrian B with a velocity of 3 km/hr. It is clear that different burst size in frequency dimension will result in different burst error rate.

In WiMAX and other relaying systems, the channel characteristics of radio links over different hops are various. It is desirable to provide schemes for BS or RS to re-dimension the burst to adapt to each hop's radio environment and capability, thus improving the network performance.

There are three kinds of burst preferred profile re-dimensioning schemes (BPRSs) in WiMAX relay systems according to invention embodiments. One is centralized BPRS, where the BS performs the most parts of the calculations, and decides the burst profiles for all hops' communication, one is distributed BPRS, where the computation of the algorithm is distributed to BS and RSs, and each RS will decide its burst profile, the other is the hybrid BPRS, which is the combination of centralized BPRS and distributed BPRS.

The centralized BPRS can decrease the capability demands in a RS, thus decreasing the cost of RS. In distributed BPRS, though RSs shall take over some computation from BS, the computation load between BS and RS is balanced, and the signaling between RS and BS can be decreased as well. The hybrid BPRS, where the burst profiles of some hops are decided by the BS, while others are decided by each RS, can suitable to RSs with different capabilities.

Figure 6:
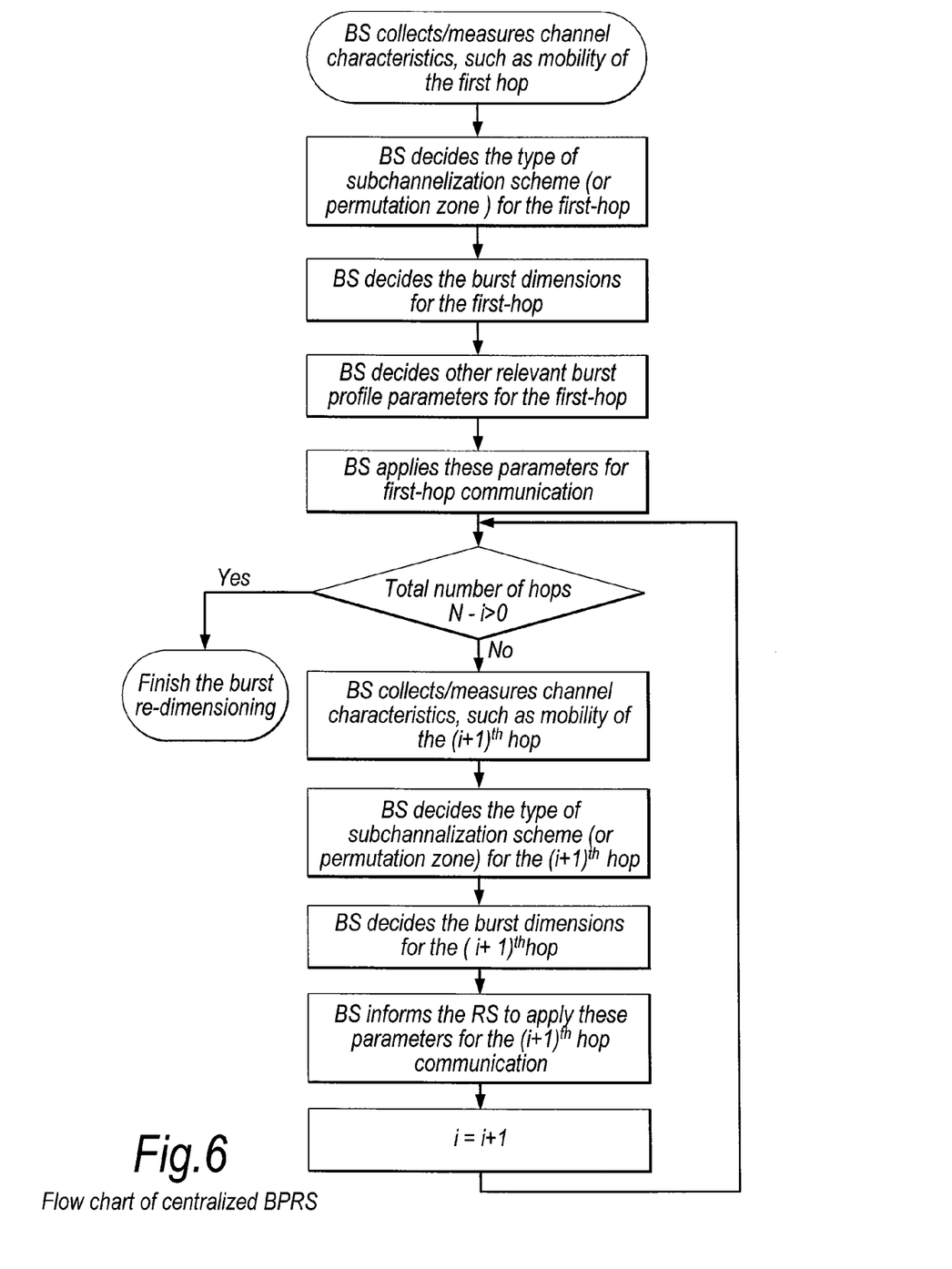
FIG. 6 shows a flow chat of centralized burst profile re-dimensioning scheme (BPRS)

Centralized BPRS:

There are 6 main steps in centralized BPRS, which also can be illustrated by FIG. 6.

Step one: BS collects the measurements, which is relevant to the burst profile of the link between BS and its first-hop RS (RS 1# in FIG. 1a, and FIG. 1b.). These measurements include the channel characteristics, such as mobility of RS. The RS's mobility can be simply reported by RS, or it can be measured through calculating the correlation factor of channel response, calculating the channel coherent time, or standard deviation of CINR. A bigger value of the correlation factor of channel response or the channel coherent time means higher mobility. A smaller standard deviation of CINR normally means lower mobility.

Step two: BS decides the type of subchannelization scheme (or permutation zone) for the first-hop radio communication. This type of the subchannelization scheme is depends on the mobility, service type, cell deployment, and other factors of the first-hop RS. For example, AMC subchannelization scheme may be suitable to a fixed RS, and PUSC may be appropriate to multi-sector cell with mobility support. This decision should consider the QoS demands for the first hop.

Step three: BS decides the burst profiles for the first-hop radio communication. This decision should also consider the QoS demands for the first hop. Because of the limited number of slots in WiMAX frame, and link budget, a service connection in the RS with higher level of services (or higher QoS demands) will have higher priority to allocate an appropriate burst. The dimension of bursts depends on the mobility of RS. For example, a burst for a fixed RS shall have bigger size in frequency dimension rather than time dimension, thus achieving more gain from frequency diversity. On the other hand, a burst for a high mobility RS shall have larger size in time dimension to obtain more time diversity gain.

Step four: BS collects the measurements, which is relevant to the burst profile for second-hop RS (RS 2# in FIG. 1a), and the second-hop MSs within the first-hop RS's coverage. The method of mobility measurement is similar to that in the step one.

Step five: BS decides the subchannelization schemes, and the burst dimension for the service connections within second-hop communication. This decision should also consider the QoS demands for the first hop. The subchannelization schemes, and the burst dimension, will be decided in terms of the mobility of second-hop RS, or second-hop MSs. For example, AMC subchannelization scheme may be suitable to a fixed RS/MS. A burst for a fixed RS/MS shall have bigger size in frequency dimension rather than time dimension, thus achieving more gain from frequency diversity. On the other hand, a burst for a high mobility RS/MS shall have larger size in time dimension to obtain more time diversity gain. If other relevant burst profile parameters, such as transmission power, coding and modulation schemes, and other factors, need to be changed because the changing of burst dimension and subchannelization scheme, they will be also adjusted by BS as well.

Step six: BS informs the first-hop RS to adjust the corresponding burst profile in terms of the decision in the step 5. The first-hop RS will re-allocate the burst for the service connections under the instructions by BS.

Step seven: If the number of hops is more than two, the step four and five will be repeated for the next-hop RSs and MSs until the last-hop MSs receive the relayed data and control information.

Figure 7:
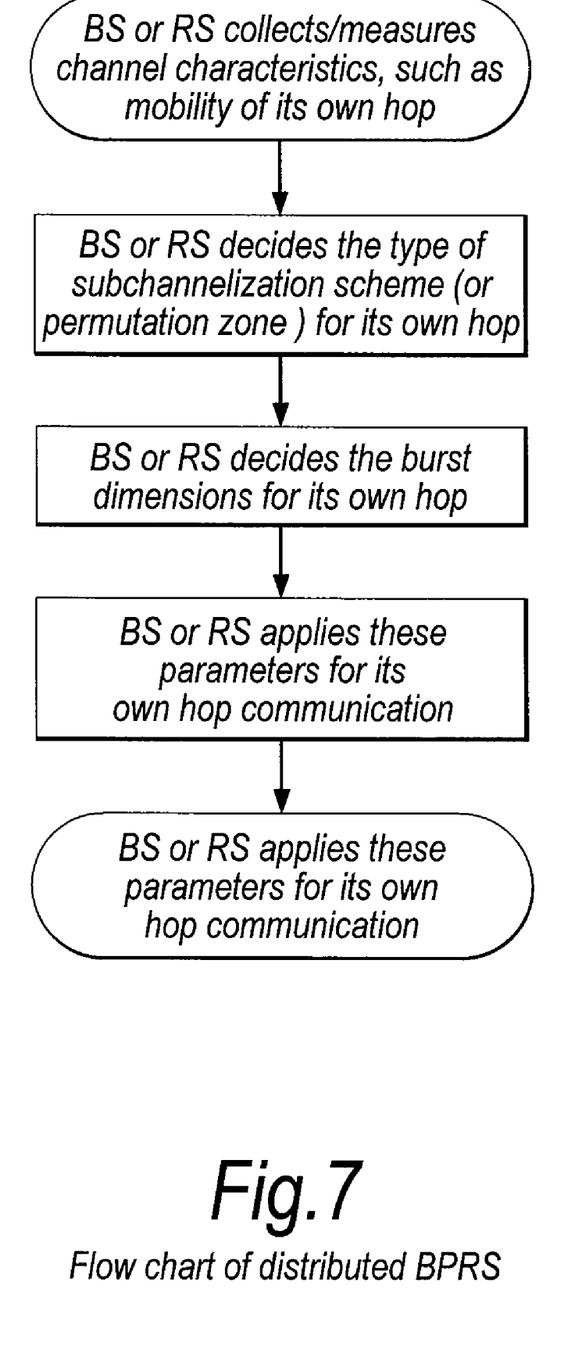
FIG. 7 shows the flow chat of distributed BPRS.

Distributed BPRS:

There are 6 main steps in distributed BPRS, which also can be explained by FIG. 7.

Step one: BS or RS collects the measurements, which is relevant to the burst profile of the link. These measurements include the channel characteristics, such as mobility of RS and MS. The mobility can be measured through calculating the correlation factor of channel response, calculating the channel coherent time, or standard deviation of CINR. A bigger value of the correlation factor of channel response or the channel coherent time means higher mobility. A smaller standard deviation of CINR normally means lower mobility.

Step two: BS or RS decides the type of subchannelization scheme (or permutation zone) for its own radio communication. This type of the subchannelization scheme is depends on the mobility, service type, cell deployment, and other factors of the link. For example, AMC subchannelization scheme may be suitable to a fixed or low mobility device, and PUSC may be appropriate to multi-sector cell with mobility support. This decision should consider the QoS demands of the link.

Step three: BS or RS decides the burst profiles for its own radio communication. This decision should also consider the QoS demands of the link. Because of the limited number of slots in WiMAX frame, and link budget, a service connection in the RS with higher level of services (or higher QoS demands) will have higher priority to allocate an appropriate burst. The dimension of bursts depends on the mobility of RS/MS. For example, a burst for a fixed or low mobility RS/MS shall have bigger size in frequency dimension rather than time dimension, thus achieving more gain from frequency diversity. On the other hand, a burst for a high mobility RS/MS shall have larger size in time dimension to obtain more time diversity gain.

Step four: BS or RS adjusts the burst profile and sends the data and control information.

Particular embodiments give schemes for BS or RS re-dimensioning the burst profiles in WiMAX relay system, thus adapting to various conditions of radio channels of each hop. The benefits from this may include:

1. Through the associated improvement in performance (due to burst profile re-dimensioning to adapt to the radio channel and service types in different hops) to provide an improved OFDMA (such as WiMAX) product;

2. The proposed method gives schemes to re-dimensioning the burst to adapt to each hop's radio channel conditions and the type of services.

3. The proposed re-dimensioning schemes can be centralized, distributed, or the combination of centralized and distributed schemes, thus giving the flexibility to using RSs with various capabilities.

4. A 2×D burst size controlling method is proposed in this patent. Based on mobility estimation, this 2×D burst size controlling method can improve the bit error rate performance.

5. If other burst profile parameters, such as transmission power, modulation and coding scheme (MCS) of a burst, and other factors, need to be changed because the changing of burst dimension and subchannelization scheme, they will also be adjusted by BS or RS as well, thus making the communication within each hop adapt to dynamically changing radio channel and services.

Particular embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A wireless transmission method for use in a multi-hop wireless communication system, the system comprising at least three communication apparatuses, one said communication apparatus comprising a source apparatus, another said communication apparatus comprising a destination apparatus and the other said communication apparatus comprising an intermediate apparatus, said source apparatus being operable to transmit information in a transmission window in a communication direction along a communication path extending from the source apparatus to the destination apparatus via the intermediate apparatus, the transmission window having a shape defined by a transmission frequency bandwidth profile over a transmission interval, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction, the method comprising:

determining for a particular transmission at least one measure of the expected link characteristics for at least two links of the communication path; and     for each of those links, configuring a particular transmission window by setting its shape and a transmission format to be used in that window in dependence upon the measure for that link only; and     during that particular transmission, transmitting information along those links using, for each of those links, the particular transmission window for that link.

2. A transmission method according to claim 1, wherein determining at least one measure of the expected link characteristics includes determining quality of service demands for that link.

3. A transmission method according to claim 1, wherein the method is a multi-carrier method and setting the transmission format includes allocating a subchannelization scheme.

4. A transmission method according to claim 1, wherein the method is an OFDM method and the shape of each transmission window is defined by a number of subcarriers occupied by the window for each of a number of symbol periods.

5. A transmission method according to claim 1, comprising, for each of those links, after configuring the particular window and before the particular transmission, setting at least one further transmission parameter in dependence upon the particular window configuration.

6. A transmission method according to claim 5, wherein a said further transmission parameter is transmission power.

7. A transmission method according to claim 5, wherein a said further transmission parameter is a coding and/or modulation scheme.

8. A transmission method according to claim 1, wherein such configuration of a particular transmission window is carried out in the source apparatus.

9. A transmission method according to claim 1, wherein, for each of those links, such configuration is carried out in the apparatus used for transmission in that window.

10. A transmission method according to claim 1, wherein, for each of those links along the communication path, such configuration is carried out either in the apparatus used for transmission in that window or in the source apparatus.

11. The transmission method according to claim 1, wherein each said transmission window comprises a region in an OFDM or OFDMA frame structure.

12. The transmission method according to claim 1, wherein each said transmission window comprises a zone in an OFDM or OFDMA frame structure.

13. The transmission method according to claim 1, wherein said source apparatus is a base station.

14. The transmission method according to claim 1, wherein said source apparatus is a user terminal.

15. The transmission method according to claim 1, wherein the source apparatus is a relay station.

16. The transmission method according to claim 1, wherein the destination apparatus is a base station.

17. The transmission method according to claim 1, wherein the destination apparatus is a user terminal.

18. The transmission method according to claim 1, wherein the destination apparatus is a relay station.

19. The transmission method according to claim 1, wherein said intermediate apparatus is a relay station.

20. A multi-hop wireless communication system, the system comprising:

at least three communication apparatuses, one said communication apparatus comprising a source apparatus, another said communication apparatus comprising a destination apparatus and the other said communication apparatus comprising an intermediate apparatus, said source apparatus being operable to transmit information in a transmission window in a communication direction along a communication path extending from the source apparatus to the destination apparatus via the intermediate apparatus, the transmission window having a shape defined by a transmission frequency bandwidth profile over a transmission interval, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction;

at least one processor configured to:

determine for a particular transmission at least one measure of the expected link characteristics for at least two links of the communication path;

for each of those links, to configure a particular transmission window by setting its shape and/or a transmission format to be used in that window in dependence upon the measure for that link only; and     a transmitter configured to, during that particular transmission, transmit information along those links using the particular transmission window for the link concerned.

21. A source apparatus for use in a multi-hop wireless communication system, the system comprising at least three communication apparatuses, one said communication apparatus comprising the source apparatus, another said communication apparatus comprising a destination apparatus and the other said communication apparatus comprising an intermediate apparatus, said source apparatus being operable to transmit information in a transmission window in a communication direction along a communication path extending from the source apparatus to the destination apparatus via the intermediate apparatus, the transmission window having a shape defined by a transmission frequency bandwidth profile over a transmission interval, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction, the source apparatus comprising:

at least one processor configured to:

determine for a particular transmission at least one measure of the expected link characteristics for at least two links of the communication path;

for each of those links, to configure a particular transmission window by setting its shape and/or a transmission format to be used in that window in dependence upon the measure for that link only; and a transmitter configured to, during that particular transmission, transmit information along a first link from the source apparatus using the particular transmission window for the first link.

22. An intermediate apparatus for use in a multi-hop wireless communication system, the system comprising:
  at least three communication apparatuses, one said communication apparatus comprising a source apparatus, another said communication apparatus comprising a destination apparatus and the other said communication apparatus comprising such an intermediate apparatus, said source apparatus being operable to transmit information in a transmission window in a communication direction along a communication path extending from the source apparatus to the destination apparatus via the intermediate apparatus, the transmission window having a shape defined by a transmission frequency bandwidth profile over a transmission interval, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction, said intermediate apparatus comprising:
  at least one processor configured to:
    determine for a particular transmission at least one measure of the expected link characteristics for at least two links of the communication path;
    for each of those links, to configure a particular transmission window by setting its shape and/or a transmission format to be used in that window in dependence upon the measure for that link only; and
  a transmitter configured to, during that particular transmission, to transmit information along a link from said intermediate apparatus using the particular transmission window for the link concerned.

23. A computer program embodied in a non-transitory computer-readable medium and operable, when executed on a computing device in a wireless multi-hop wireless communication system, to carry out a transmission method, the multi-hop wireless communication system comprising at least three communication apparatuses, one said communication apparatus comprising a source apparatus, another said communication apparatus comprising a destination apparatus and the other said communication apparatus comprising an intermediate apparatus, said source apparatus being operable to transmit information in a transmission window having a shape defined by a transmission frequency bandwidth profile over a transmission interval in a communication direction along a communication path extending from the source apparatus to the destination apparatus via the intermediate apparatus, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction, the method comprising:
  determining for a particular transmission at least one measure of the expected link characteristics for at least two links of the communication path; and
  for each of those links, configuring a particular transmission window by setting its shape and/or a transmission format to be used in that window in dependence upon the measure for that link only; and
  during that particular transmission, transmitting information along those links using the particular transmission window for the link concerned.

24. A wireless transmission method for use in a multi-hop wireless communication system, the system comprising at least three communication apparatuses, one said communication apparatus comprising a source apparatus, another said communication apparatus comprising a destination apparatus and the other said communication apparatus comprising an intermediate apparatus, said source apparatus being operable to transmit information in a transmission window in a communication direction along a communication path extending from the source apparatus to the destination apparatus via the intermediate apparatus, the transmission window having a shape defined by a transmission frequency bandwidth profile over a transmission interval, the communication path comprising a series of two or more consecutive links from the source apparatus to the destination apparatus, and the intermediate apparatus being operable to receive information from a previous communication apparatus in said communication direction and to transmit the received information in such a transmission window to a subsequent apparatus in said communication direction, the method comprising:
  determining for a particular transmission at least one measure of the expected link characteristics for at least two links of the communication path, wherein determining at least one measure of the expected link characteristics comprises determining mobility of the link; and
  for each of those links, configuring a particular transmission window by setting its shape and/or a transmission format to be used in that window in dependence upon the measure for that link only; and
  during that particular transmission, transmitting information along those links using, for each of those links, the particular transmission window for that link.

* * * * *